US010334377B2

(12) United States Patent
Green, III et al.

(10) Patent No.: US 10,334,377 B2
(45) Date of Patent: Jun. 25, 2019

(54) MULTI-PURPOSE USER-DEFINABLE WIRELESS CHANNEL OPERATION

(71) Applicant: ALTEROS, INC., Stow, OH (US)

(72) Inventors: Robert T. Green, III, Streetsboro, OH (US); Brian K. Fair, Boyds, MD (US); Jacquelynn A. Green, Streetsboro, OH (US)

(73) Assignee: ALTEROS, INC., Stow, OH (US)

( * ) Notice: Subject to any disclaimer, the term of this patent is extended or adjusted under 35 U.S.C. 154(b) by 0 days.

(21) Appl. No.: 15/590,930

(22) Filed: May 9, 2017

(65) Prior Publication Data

US 2017/0332169 A1 Nov. 16, 2017

Related U.S. Application Data

(60) Provisional application No. 62/334,336, filed on May 10, 2016.

(51) Int. Cl.
*H04B 7/00* (2006.01)
*H04R 27/00* (2006.01)

(52) U.S. Cl.
CPC ......... *H04R 27/00* (2013.01); *H04R 2420/07* (2013.01)

(58) Field of Classification Search
CPC ..... H04R 3/005; H04R 27/00; H04R 2420/07
See application file for complete search history.

(56) References Cited

U.S. PATENT DOCUMENTS

| | | | | |
|---|---|---|---|---|
| 5,189,734 | A | 2/1993 | Bailey et al. | |
| 5,603,086 | A | 2/1997 | Cree et al. | |
| 6,804,790 | B2 | 10/2004 | Rhee et al. | |
| 2009/0054052 | A1 | 2/2009 | Evans | |
| 2009/0179768 | A1* | 7/2009 | Sander | H04M 1/05 340/13.27 |
| 2012/0120313 | A1* | 5/2012 | Green | H04B 1/04 348/485 |
| 2015/0372717 | A1 | 12/2015 | Schrum, Jr. et al. | |
| 2017/0332331 | A1 | 11/2017 | Green et al. | |

OTHER PUBLICATIONS

U.S. Non-Final Office Action for U.S. Appl. No. 15/590,915 dated Dec. 15, 2017.
U.S. Final Office Action for U.S. Appl. No. 15/590,915 dated Jun. 22, 2018.
U.S. Advisory Action for U.S. Appl. No. 15/590,915 dated Oct. 15, 2018.
U.S. Non-Final Office Action for U.S. Appl. No. 15/590,915 dated Nov. 28, 2018.

* cited by examiner

*Primary Examiner* — Xin Jia
(74) *Attorney, Agent, or Firm* — Sherman IP LLP; Kenneth L. Sherman; Hemavathy Perumal

(57) ABSTRACT

One embodiment provides a method for multi-purpose user-definable wireless channel operation. The method comprises wirelessly receiving switch state information from a first wireless media device. The switch state information indicates a current switch position of a first switch corresponding to the first wireless media device. The method further comprises wirelessly receiving signals from the first wireless media device, and selectively routing the signals to one of multiple pre-determined destinations based on the switch state information and a first signal routing table corresponding to the first wireless media device. The first signal routing table maps different switch positions of the first switch to different pre-determined destinations of the multiple pre-determined destinations.

20 Claims, 9 Drawing Sheets

310

MULTI-PURPOSE USER-DEFINABLE WIRELESS CHANNEL OPERATION

CROSS REFERENCE TO RELATED APPLICATIONS

This application claims priority from U.S. Provisional Patent Application Ser. No. 62/334,336, filed on May 10, 2016, incorporated herein by reference.

TECHNICAL FIELD

One or more embodiments relate generally to digital media networking, and in particular, a method and system for multi-purpose user-definable wireless channel operation.

BACKGROUND

A wireless electronic device may be used to wirelessly transmit data to one or more other electronic devices (e.g., another wireless electronic device, a non-wireless electronic device, etc.) without use of a physical cable. A wireless microphone is an example wireless electronic device used for transmitting sound to a broadcast/media device/system, such as an amplifier or a recording device. Wireless microphones may operate in various different spectrum bands. Wireless microphones may be designed to operate on a discrete set of frequencies within a spectrum band, or they may cover an entire range of frequencies in the band.

SUMMARY

One embodiment provides a method for multi-purpose user-definable wireless channel operation. The method comprises wirelessly receiving switch state information from a first wireless media device. The switch state information indicates a current switch position of a first switch corresponding to the first wireless media device. The method further comprises wirelessly receiving signals from the first wireless media device, and selectively routing the signals to one of multiple pre-determined destinations based on the switch state information and a first signal routing table corresponding to the first wireless media device. The first signal routing table maps different switch positions of the first switch to different pre-determined destinations of the multiple pre-determined destinations.

These and other features, aspects and advantages of the present invention will become understood with reference to the following description, appended claims and accompanying figures.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
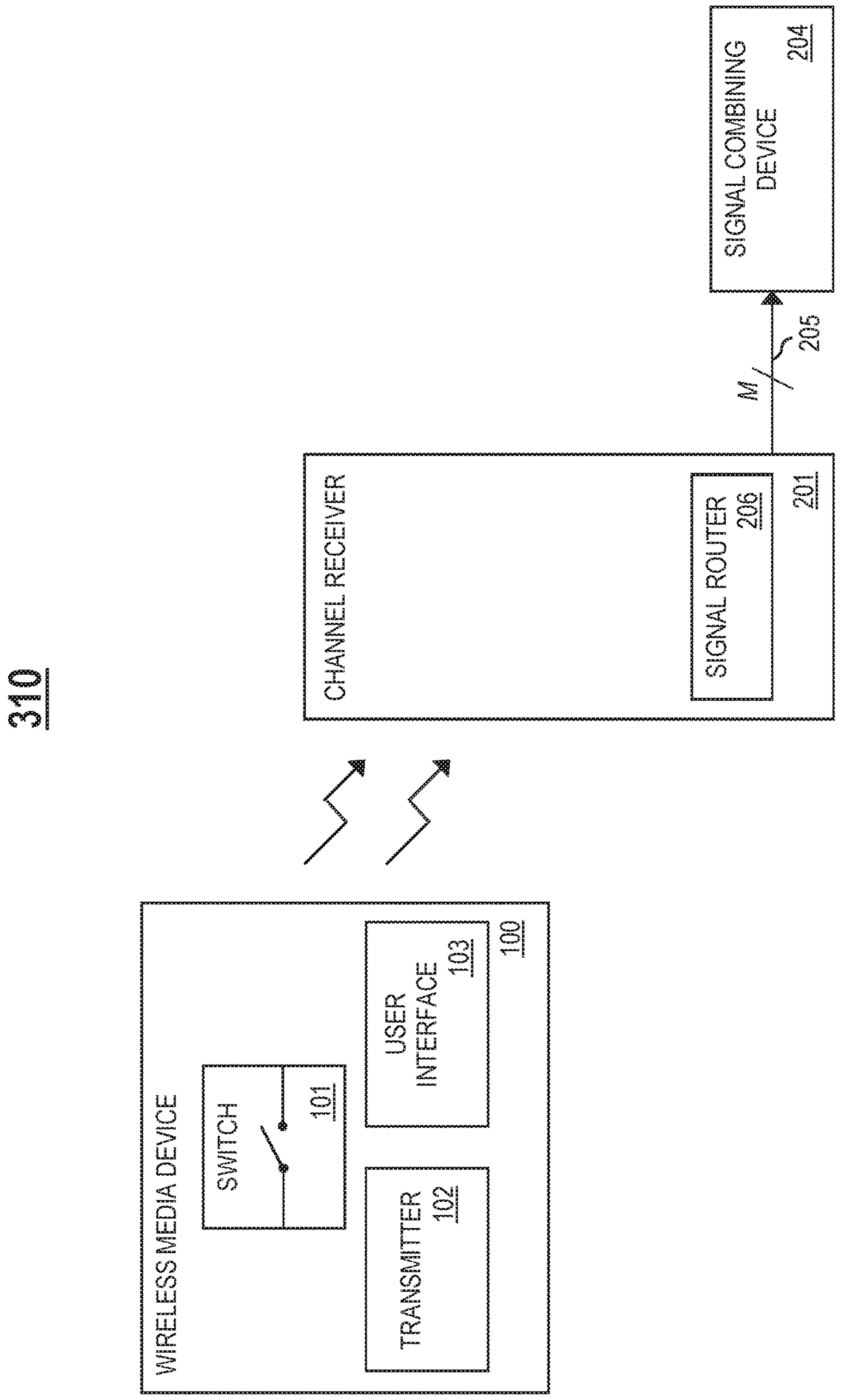
FIG. 1 illustrates an example wireless system for multi-purpose user-definable wireless channel operation, in accordance with one embodiment.

The detailed description explains the preferred embodiments of the invention together with advantages and features, by way of example with reference to the drawings.

DETAILED DESCRIPTION

One or more embodiments relate generally to digital media networking, and in particular, a method and system for multi-purpose user-definable wireless channel operation. One embodiment provides a method for multi-purpose user-definable wireless channel operation. The method comprises wirelessly receiving switch state information from a first wireless media device. The switch state information indicates a current switch position of a first switch corresponding to the first wireless media device. The method further comprises wirelessly receiving signals from the first wireless media device, and selectively routing the signals to one of multiple pre-determined destinations based on the switch state information and a first signal routing table corresponding to the first wireless media device. The first signal routing table maps different switch positions of the first switch to different pre-determined destinations of the multiple pre-determined destinations.

For expository purposes, the term "media device" as used herein refers to a professional broadcast/media device/system, such as a professional audio device/system or a professional video device/system, etc. Examples of media devices include, but are not limited to, microphones, wireless microphones, amplifiers, audio mixers, recording devices, etc. Examples of different users/operators of media devices include, but are not limited to, broadcasters, programming networks, theaters, venues (e.g., sports venues, music venues, etc.), festivals, fairs, film studios, conventions, corporate events, houses of worship, sports leagues, schools, etc.

For expository purposes, the term "wireless media device" as used herein refers to a media device capable of exchanging data with another device (e.g., another media device) wirelessly (i.e., without need of a physical cable). For example, a wireless microphone is a wireless media device used to capture and transmit audio data (i.e., sound)

to another device (e.g., an amplifier, a recording device, etc.) wirelessly. Examples of wireless microphones include, but are not limited to, hand-held or body-worn wireless microphones, in-ear monitors, media devices used for cueing on-air talent, intercom systems for backstage communications, etc.

There is a need for talent performing or presenting at a live event to have the ability to communicate with off-air personnel (e.g., production personnel) without having signals going over the air or to a main public address (PA) speaker. Conventionally, this may be implemented by adding a second, typically wired, microphone and path to transmit signals directly to off-air personnel, resulting in additional complexity and costs. Alternatively, the signals may be routed manually by a user/operator (e.g., an audio/sound operator). Manually routing signals, however, is prone to human error and may result in an inadvertent transmission of a private communication exchange between the talent and the off-air personnel over the air or to the PA speaker. As such, such conventional methods are less than ideal.

Further, there is a need for talent or other on-air personnel to be able to mute their audio signal when off the air. In a live production environment, a person wearing a wireless microphone does not always know whether their audio signal is being transmitted and heard at another location.

One or more embodiments of the invention may be used in wireless microphone systems, wireless systems, public address systems, and other professional audio systems.

FIG. 1 illustrates an example wireless system 310 for multi-purpose user-definable wireless channel operation, in accordance with one embodiment. The system 310 comprises one or more wireless media devices 100. In one embodiment, each wireless media device 100 is utilized/operated by a user/operator at an event (e.g., an on-air talent/performer performing live at an event, such as a concert, an awards ceremony, etc.). In one embodiment, the system 310 is a wireless microphone system, and each wireless media device 100 is a wireless microphone.

Each wireless media device 100 may be associated with a particular application. For example, one wireless media device 100 of the system 310 may be a wireless microphone transmitter for a vocalist performing at the event, whereas another wireless media device 100 of the system 310 may be a wireless microphone transmitter for a guitarist performing at the same event.

In one embodiment, each wireless media device 100 is assigned a corresponding unique identifier (ID).

Each wireless media device 100 comprises, but is not limited to, one or more of the following components: (1) a transmitter unit 102 for wirelessly transmitting data/signals (e.g., audio data/signals, video data/signals, etc.), and (2) a user interface (UI) 103 for configuring one or more parameters/settings for the wireless media device 100. In one embodiment, each wireless media device 100 may further comprise a receiver unit (not shown) for wirelessly receiving data/signals (e.g., control commands comprising instructions for adjusting an operating mode of the wireless media device 100).

Each wireless media device 100 has a corresponding switch 101. In one embodiment, a switch 101 corresponding to a wireless media device 100 is integrated in/combined with the wireless media device 100, as shown in FIG. 1.

Each switch (e.g., switch 101 in FIG. 1, switch 104 in FIG. 6) corresponding to a wireless media device 100 may be positioned in one of multiple switch positions (i.e., states). In one embodiment, the switch is a momentary switch that may be positioned in either an open position and or a close position, where the open position is the default switch position. Each switch position of the switch may correspond to a particular pre-determined destination of multiple pre-determined destinations that signals from the wireless media device 100 may be routed to. In one embodiment, the switch is equipped with a button (e.g., a soft-touch button), a knob, or another type of component that may be manipulated by a user/operator utilizing/operating the wireless media device 100 to adjust a current switch position of the switch (e.g., pressing/releasing the button or twisting the knob), thereby allowing the user/operator to select a desired pre-determined destination that signals originating from the wireless media device 100 should be routed to.

The system 310 further comprises a channel receiver 201 for wirelessly receiving data/signals (e.g., audio data/signals, video data/signals, etc.) transmitted from a wireless media device 100. The channel receiver 201 is a media device. In one embodiment, the channel receiver 201 is an audio channel receiver.

The system 310 further comprises a signal combining device 204. The signal combining device 204 is a media device. In one embodiment, the signal combining device 204 is an audio mixer.

In one embodiment, the channel receiver 201 is connected to the signal combining device 204 via a communication bus 205 comprising M channels, wherein M>1. Each channel of the communication bus 205 corresponds to a particular pre-determined destination of the multiple pre-determined destinations that signals from a wireless media device 100 may be routed to. In one embodiment, the communication bus 205 is an audio bus comprising M audio channels.

A wireless media device 100 is configured to transmit, via the transmitter unit 102, switch state information for the wireless media device 100 to the channel receiver 201. Switch state information for a wireless media device 100 comprises a limited amount of data (e.g., at least 1 bit) identifying a current switch position (i.e., current state) of a switch (e.g., switch 101 in FIG. 1, switch 104 in FIG. 6) corresponding to the wireless media device 100.

The system 310 further comprises a signal router 206 integrated in/combined with the channel receiver 201. The signal router 206 is configured to: (1) receive signals (e.g., audio signals, video signals, etc.) from a wireless media device 100, and (2) perform signal routing by selectively routing the signals to one of the multiple pre-determined destinations based on switch state information for the wireless media device 100 and a pre-determined signal routing table corresponding to the wireless media device 100 (e.g., a pre-determined signal routing table corresponding to an unique ID of the wireless media device 100).

A pre-determined signal routing table corresponding to a wireless media device 100 maps different switch positions of each switch corresponding to the wireless media device 100 to different pre-determined destinations of the multiple pre-determined destinations. As described in detail later herein, a pre-determined signal routing table is user-definable.

Figure 3:
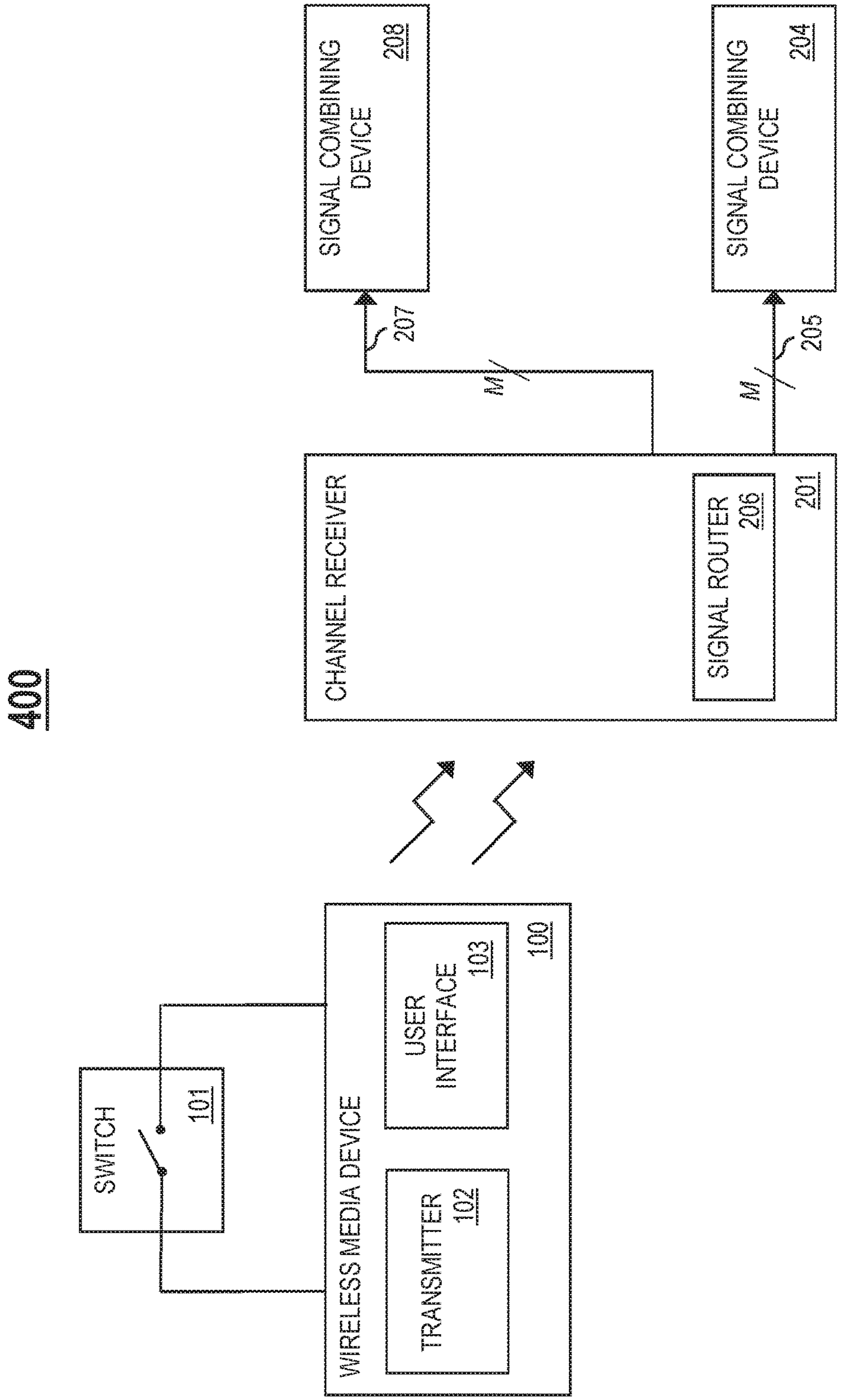
FIG. 3 illustrates another example wireless system for multi-purpose user-definable wireless channel operation, wherein the system includes multiple communication buses and multiple signal combining devices, in accordance with one embodiment.

In one embodiment, each pre-determined destination of the multiple pre-determined destinations corresponds to a particular channel of a communication bus (e.g., communication bus 205 in FIG. 1, communication bus 207 in FIG. 3). The signal router 206 routes signals to a particular pre-determined destination via a particular channel of a communication bus corresponding to the pre-determined destination. In one embodiment, the signal router 206 is an audio signal router configured to selectively route audio signals to an appropriate audio channel of an audio bus.

Figure 5:
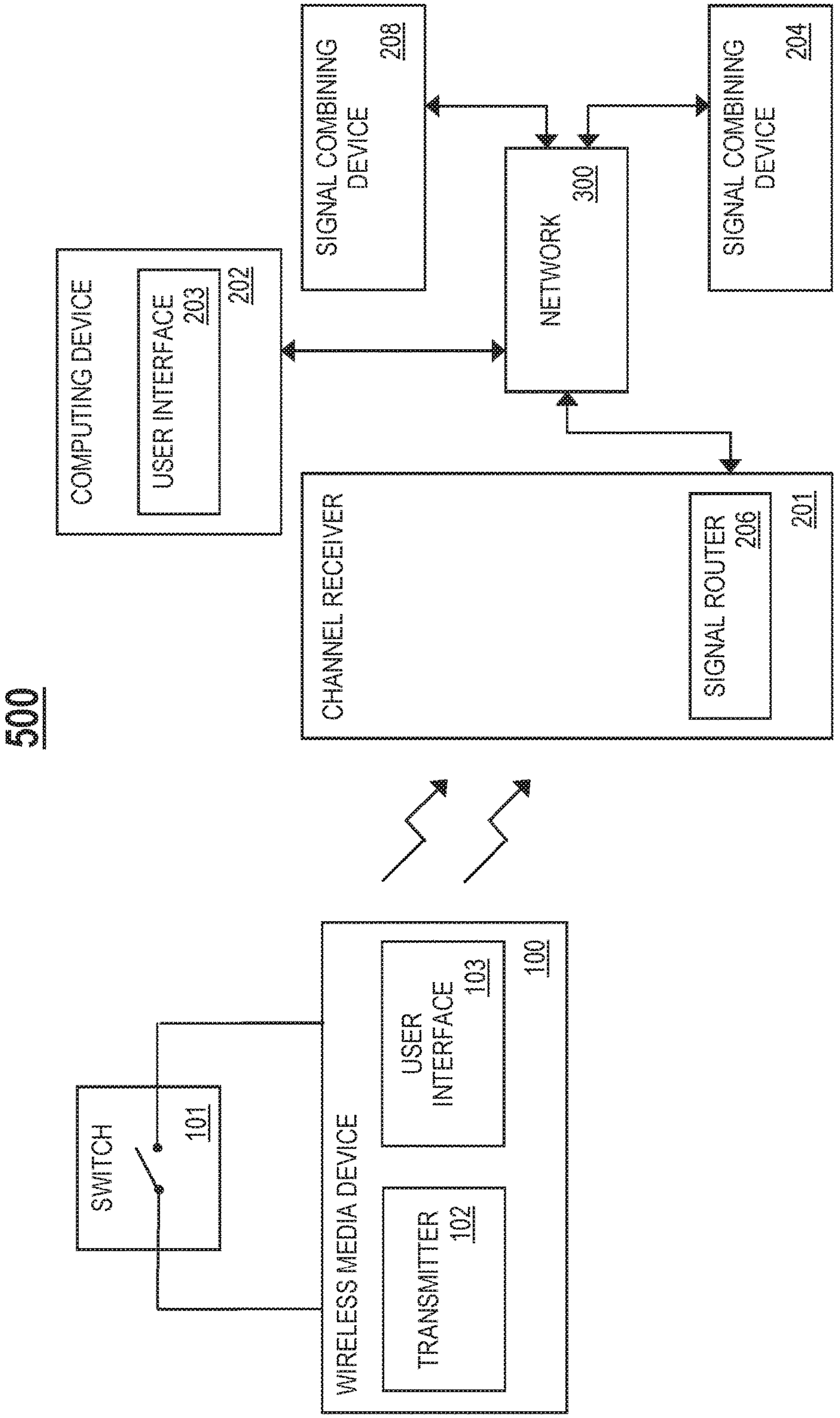
FIG. 5 illustrates another example wireless system for multi-purpose user-definable wireless channel operation, wherein the system comprises a network connection, in accordance with one embodiment.

In another embodiment, the signal router 206 routes signals to a particular pre-determined destination over a network connection 300 (FIG. 5).

In one embodiment, if a switch corresponding to a wireless media device 100 is a momentary switch positioned in the default switch position (i.e., open position), the signal router 206 routes signals from the wireless media device 100 to a pre-determined destination that allows the signals to be heard over the air or on the main (e.g., the main PA speaker). If the switch is then held/pressed closed such that the switch is now positioned in the close position, the signal router 206 re-routes signals from the wireless media device 100 to a different pre-determined destination that allows the signals to be heard by off-air personnel (e.g., production personnel) but not over the air or on the main. If the switch is subsequently released such that the switch returns to the default switch position (i.e., open position), the signal router 206 returns signals from the wireless media device 100 back over the air or on the main. Therefore, the switch supports multi-purpose user-definable wireless channel operation. Unlike conventional methods, additional equipment or personnel are not required, thereby preventing additional complexity and costs.

Figure 2:
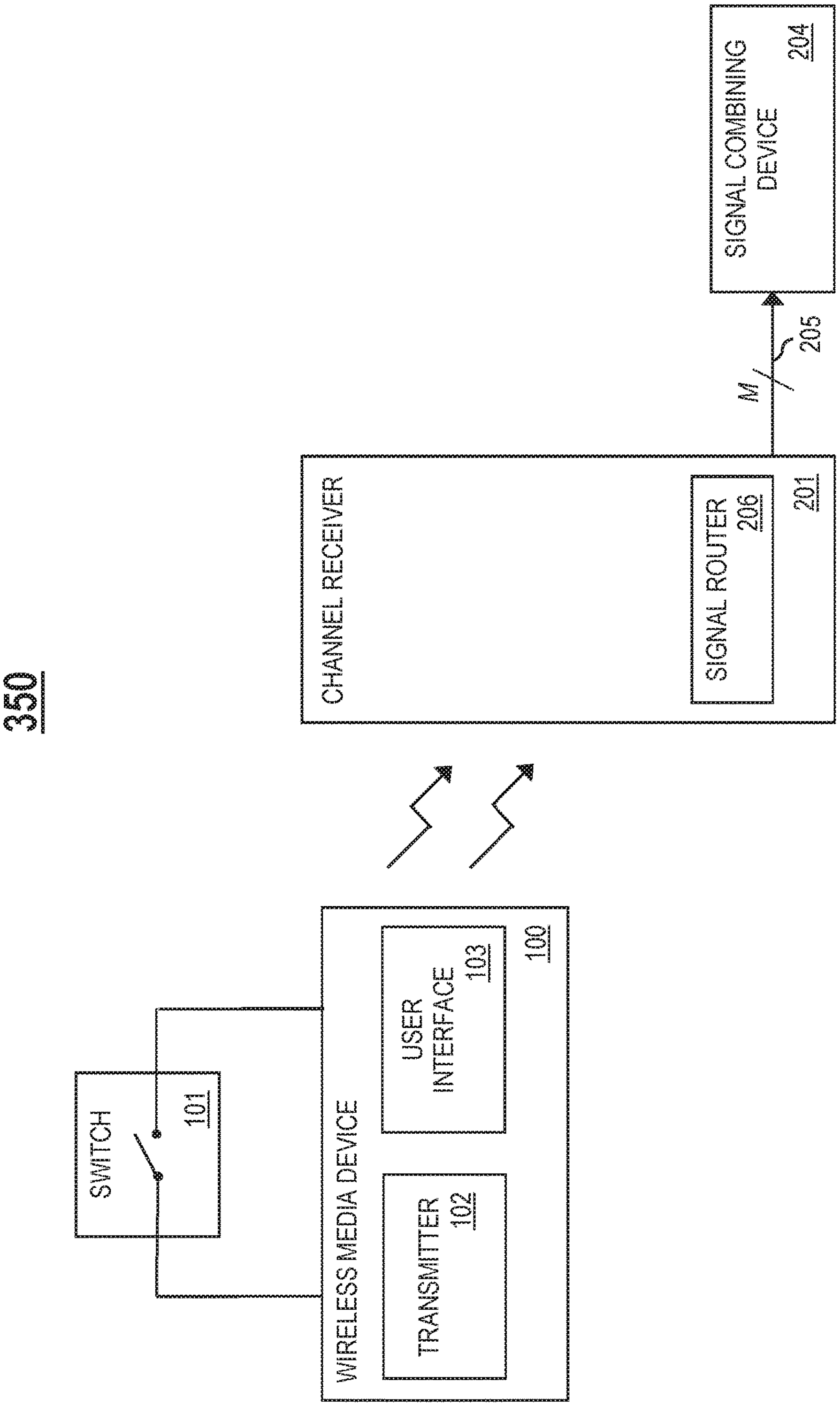
FIG. 2 illustrates another example wireless system for multi-purpose user-definable wireless channel operation, wherein a switch corresponding to a wireless media device is external to the wireless media device, in accordance with one embodiment.

FIG. 2 illustrates another example wireless system 350 for multi-purpose user-definable wireless channel operation, wherein a switch corresponding to a wireless media device 100 is external to the wireless media device 100, in accordance with one embodiment. The system 350 is similar to system 310 in FIG. 1. However, unlike the system 310 where each wireless media device 101 has a corresponding switch 101 integrated in/combined with the wireless media device 100, each wireless media device 100 in the system 350 has a corresponding switch 101 that is coupled to but separate from and external to the wireless media device 100.

FIG. 3 illustrates another example wireless system 400 for multi-purpose user-definable wireless channel operation, wherein the system 400 includes multiple communication buses and multiple signal combining devices, in accordance with one embodiment. The system 400 is similar to system 350 in FIG. 2. However, unlike the system 350 that includes only the signal combining device 204, the system 400 comprises one or more additional signal combining devices 208, such as a signal combining device 208.

In one embodiment, the channel receiver 201 is connected to the signal combining device 208 via a separate communication bus 207 comprising M channels, wherein M>1. Each channel of the communication bus 207 corresponds to a particular pre-determined destination of the multiple pre-determined destinations. In one embodiment, the communication bus 207 is an audio bus comprising M audio channels.

Figure 4:
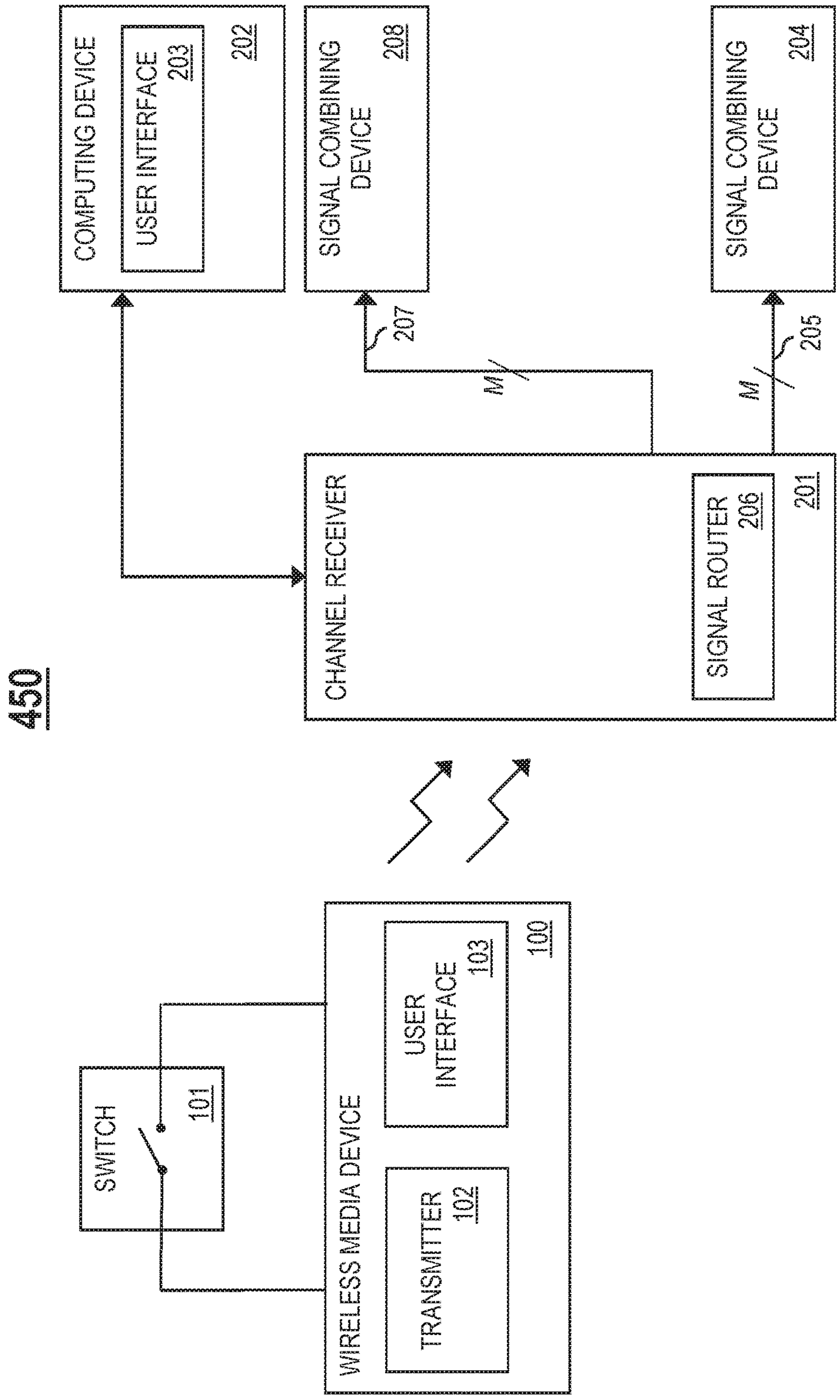
FIG. 4 illustrates another example wireless system for multi-purpose user-definable wireless channel operation, wherein the system comprises a computing device, in accordance with one embodiment.

FIG. 4 illustrates another example wireless system 450 for multi-purpose user-definable wireless channel operation, wherein the system 450 comprises a computing device 202, in accordance with one embodiment. The system 450 is similar to system 400 in FIG. 3. However, unlike the system 400, the system 450 further comprises a computing device 202. The computing device 202 is configured to exchange data (e.g., control data) with the channel receiver 201 over a point-to-point connection (e.g., a wireless connection such as a WiFi connection or a cellular data connection, a wired connection, or a combination of the two). The computing device 202 may be operated by a user/operator tasked with managing the system 450 (e.g., an audio/sound operator).

In one embodiment, the computing device 202 comprises an electronic device, such as a laptop computer, a desktop computer, a tablet, a smart phone, etc.

In one embodiment, the computing device 202 comprises a user interface 203 configured to provide information and one or more functionalities that a user/operator (e.g., an audio/sound operator) tasked with managing the system 450 may utilize for management of the system 450. The functionalities include, but are not limited to, configuring/modifying a pre-determined signal routing table corresponding to a wireless media device 101. For example, the user/operator may provide user input specifying, for each switch position of a switch corresponding to the wireless media device 100, a particular pre-determined destination of the multiple pre-determined destinations that the switch position should be mapped to. The computing device 202 transmits control data to the channel receiver 201. Based on user input provided by the user/operator via the user interface 203, the control data may comprise one or more modifications to a pre-determined signal routing table corresponding to a wireless media device 101.

FIG. 5 illustrates another example wireless system 500 for multi-purpose user-definable wireless channel operation, wherein the system 500 comprises a network connection 300, in accordance with one embodiment. The system 500 is similar to system 450 in FIG. 4. However, unlike the system 450 where data is exchanged between the channel receiver 201, the computing device 202, and the signal combining devices 204, 208 via point-to-point connections, the system 500 further comprises the network connection 300 for exchanging data between the channel receiver 201, the computing device 202, and the signal combining devices 204, 208. Further, signals originating from a wireless media device 100 of the system 500 may be routed to a particular pre-determined destination over the same network connection 300 as control data. For example, low latency audio signals over IP allows multichannel audio to be transferred over the same network connection as control data.

Figure 6:
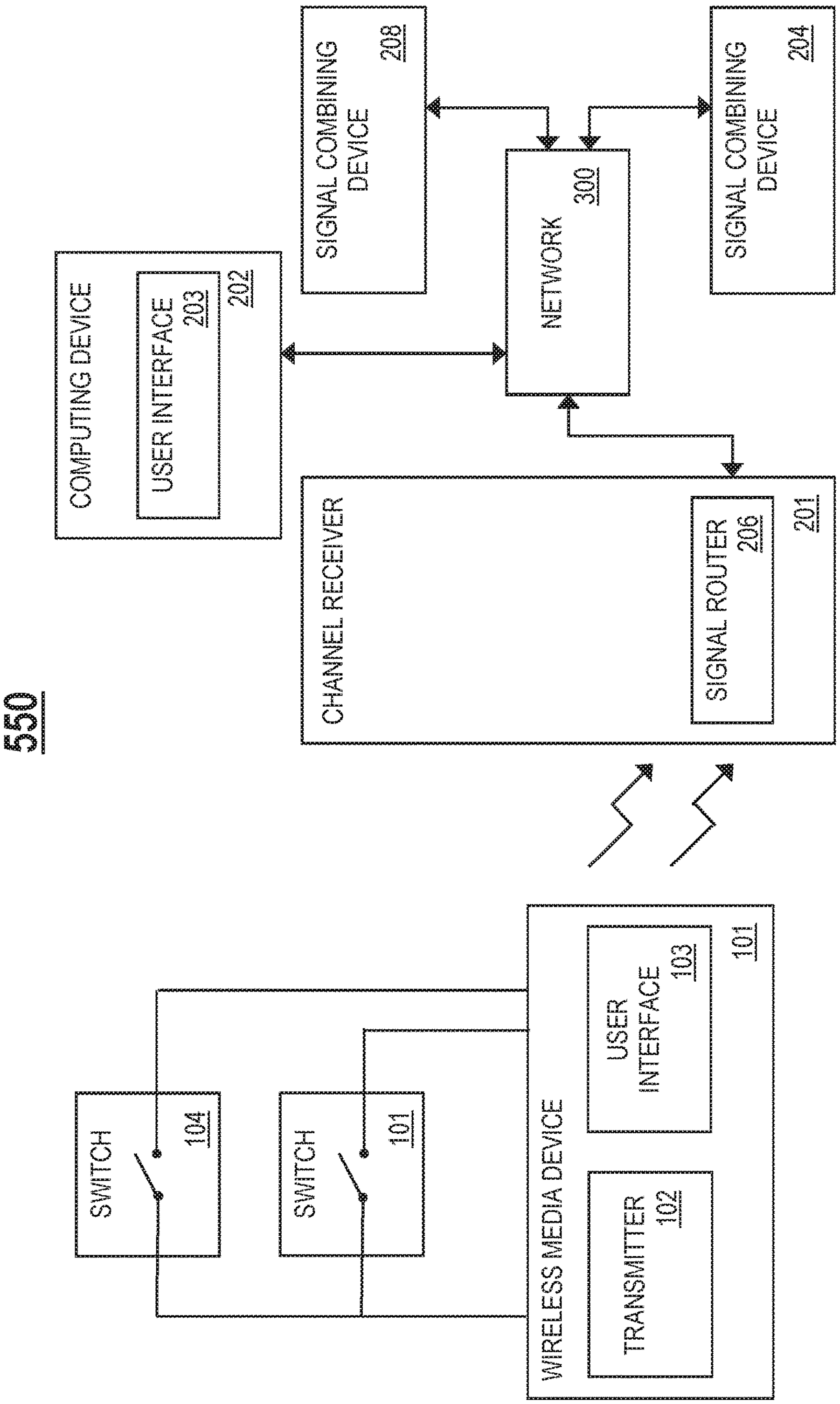
FIG. 6 illustrates another example wireless system for multi-purpose user-definable wireless channel operation, wherein a wireless media device has an additional switch, in accordance with one embodiment.

FIG. 6 illustrates another example wireless system 550 for multi-purpose user-definable wireless channel operation, wherein a wireless media device 100 has an additional switch, in accordance with one embodiment. The system 550 is similar to system 500 in FIG. 5. However, unlike the system 500 a wireless media device 100 has only one corresponding switch 101, a wireless media device 100 in the system 550 has multiple corresponding switches, such as a switch 101 and an additional switch 104. The additional switch 104 may provide one or more additional routing options (i.e., routing signals from the wireless media device 100 to one or more additional pre-determined destinations) or a mute function.

For example, assume both the switch 101 and the additional switch 104 are momentary switches. The open position (i.e., default switch position) of the switch 101 corresponds to a first routing option (e.g., delivering signals over the air, such as to the main PA speaker), whereas the close position of the switch 101 corresponds to a second routing option (e.g., delivering signals to off-air personnel). The close position of the additional switch 104 corresponds to a third routing option or a mute function (i.e., the wireless media device 100 is silenced/muted).

Figure 7:
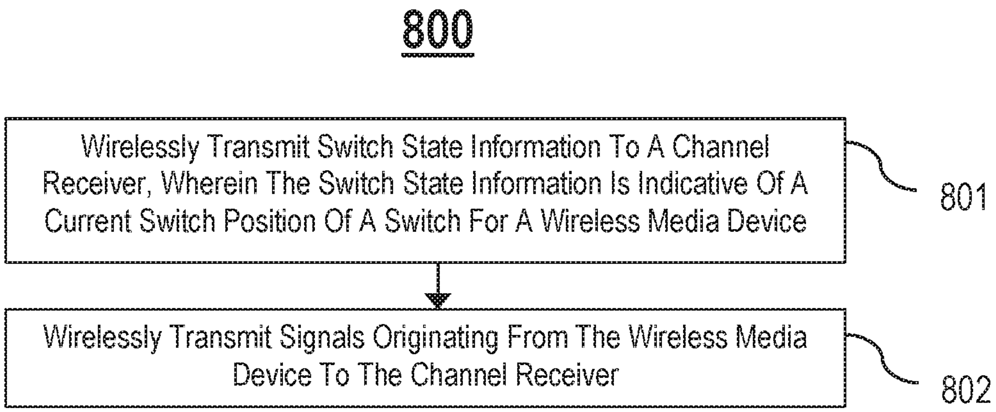
FIG. 7 illustrates a flowchart of an example process for multi-purpose user-definable wireless channel operation, in accordance with one embodiment.

FIG. 7 illustrates a flowchart of an example process 800 for multi-purpose user-definable wireless channel operation, in accordance with one embodiment. In process block 801, wirelessly transmit switch state information to a channel receiver, wherein the switch state information is indicative of a current switch position of a switch for a wireless media device. In process block 802, wirelessly transmit signals originating from the wireless media device to the channel receiver.

In one embodiment, process blocks 801-802 may be performed utilizing one or more components of a wireless media device 100.

Figure 8:
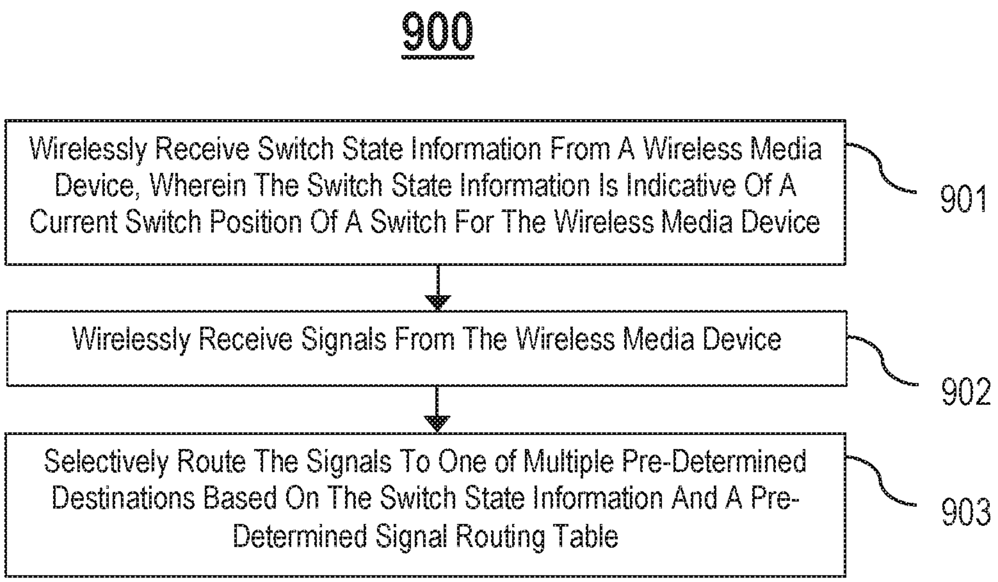
FIG. 8 illustrates a flowchart of another example process for multi-purpose user-definable wireless channel operation, in accordance with one embodiment.

FIG. 8 illustrates a flowchart of another example process 900 for multi-purpose user-definable wireless channel operation, in accordance with one embodiment. In process block 901, wirelessly receive switch state information from a wireless media device, wherein the switch state information is indicative of a current switch position of a switch for the wireless media device. In process block 902, wirelessly receive signals from the wireless media device. In process block 903, selectively route the signals to one of multiple pre-determined destinations based on the switch state information and a pre-determined signal routing table.

In one embodiment, process blocks 901-903 may be performed utilizing the channel receiver 201.

Figure 9:
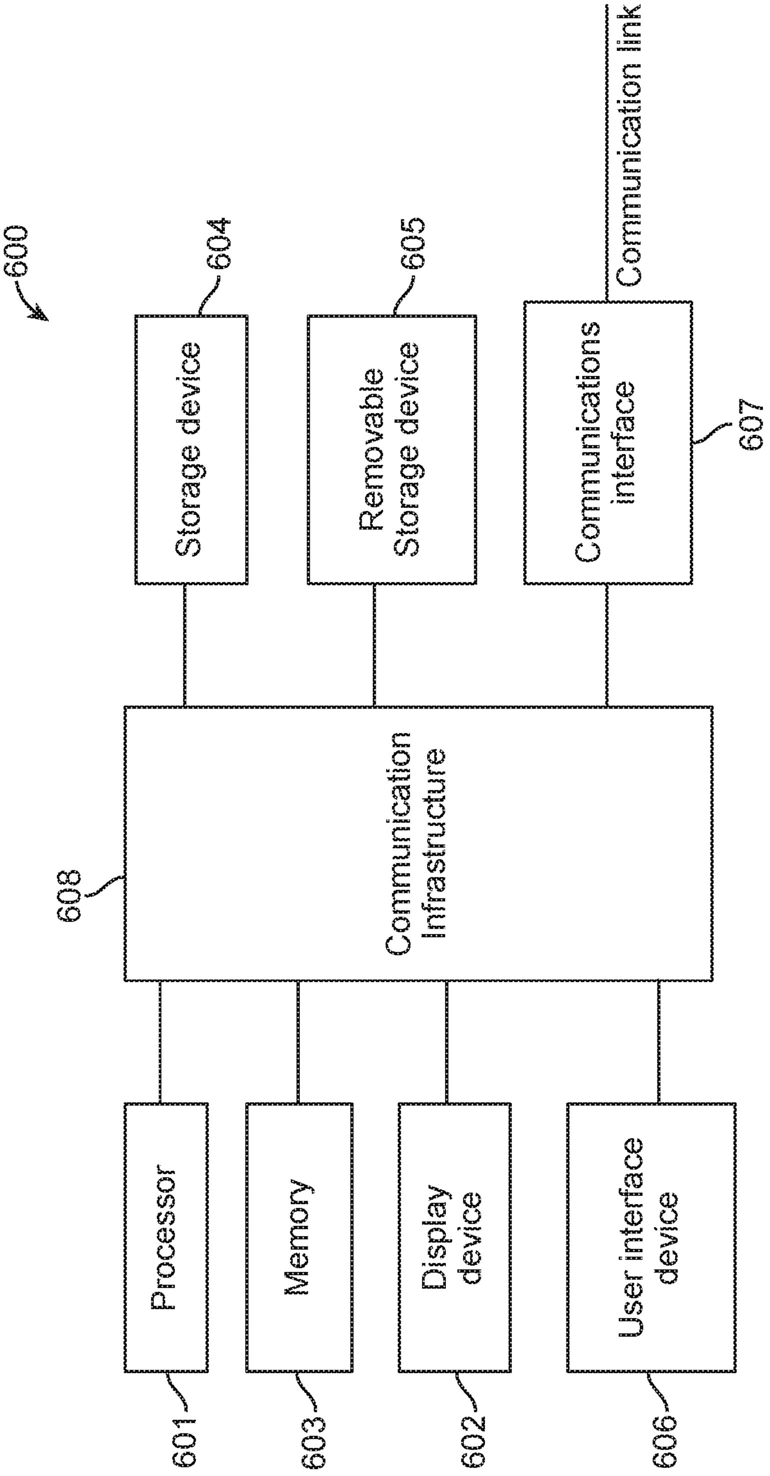
FIG. 9 is a high-level block diagram showing an information processing system comprising a computer system useful for implementing the disclosed embodiments.

FIG. 9 is a high-level block diagram showing an information processing system comprising a computer system 600 useful for implementing the disclosed embodiments. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), user interface device 606 (e.g., keyboard, touch screen, keypad, pointing device), and a communication interface 607 (e.g., modem, a network interface (such as an Ethernet card), a communications port, or a PCMCIA slot and card). The main memory 603 may store instructions that when executed by the one or more processors 601 cause the one or more processors 601 to perform one or more process blocks of the process 800 and the process 900.

The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process. In one embodiment, processing instructions for one or more process blocks of process 800 (FIG. 7) and process 900 (FIG. 8) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method for multi-purpose user-definable wireless channel operation, comprising:

wirelessly receiving switch state information from a first wireless media device, wherein the switch state information indicates a current switch position of a first switch corresponding to the first wireless media device;

wirelessly receiving signals from the first wireless media device; and selectively routing the signals to one of multiple pre-determined destinations based on the switch state information and a first signal routing table corresponding to the first wireless media device, wherein the first signal routing table maps different switch positions of the first switch to different pre-determined destinations of the multiple pre-determined destinations, and each pre-determined destination of the multiple pre-determined destinations corresponds to a particular channel of a communication bus.

2. The method of claim 1, wherein routing the signals to the first pre-determined destination comprises one of the following: routing the signals to a first channel of a first communication bus coupled to a first signal combining device, or routing the signals over a network connection to the first signal combining device.

3. The method of claim 2, wherein the method is performed at a second media device, the first wireless media device is a wireless microphone, the first communication bus is an audio bus, and the first signal combining device is an audio mixer.

4. The method of claim 3, further comprising:

maintaining, on the second media device, one or more signal routing tables for one or more wireless media devices.

5. The method of claim 4, further comprising:

receiving control data from a computing device, wherein the control data is based on user input received at the computing device, and the user input comprises one or more modifications to a signal routing table corresponding to a wireless media device.

6. The method of claim 1, wherein the first switch is integrated in the first wireless media device.

7. The method of claim 1, wherein the first switch is separate from and external to the first wireless media device.

8. The method of claim 1, wherein:

the signals are routed to a first pre-determined destination of the multiple pre-determined destinations in response to positioning the first switch in an open position; and the signals are routed to a second pre-determined destination of the multiple pre-determined destinations in response to positioning the first switch in a close position.

9. The method of claim 8, wherein:

an additional switch corresponds to the first wireless media device; and one of the following occurs in response to positioning the additional switch in a close position: the signals are routed to a third pre-determined destination of the multiple pre-determined destinations, or the first wireless media device is muted.

10. A system for multi-purpose user-definable wireless channel operation, comprising:

at least one processor; and a non-transitory processor-readable memory device storing instructions that when executed by the at least one processor causes the at least one processor to perform operations including:

wirelessly receiving switch state information from a first wireless media device, wherein the switch state information indicates a current switch position of a first switch corresponding to the first wireless media device;

wirelessly receiving signals from the first wireless media device; and selectively routing the signals to one of multiple pre-determined destinations based on the switch state information and a first signal routing table corresponding to the first wireless media device, wherein the first signal routing table maps different switch positions of the first switch to different pre-determined destinations of the multiple pre-determined destinations, and each pre-determined destination of the multiple pre-determined corresponds to a particular channel of a communication bus.

11. The system of claim 10, wherein routing the signals to the first pre-determined destination comprises one of the following: routing the signals to a first channel of a first communication bus coupled to a first signal combining device, or routing the signals over a network connection to the first signal combining device.

12. The system of claim 11, wherein the system is a second media device, the first wireless media device is a wireless microphone, the first communication bus is an audio bus, and the first signal combining device is an audio mixer.

13. The system of claim 12, wherein the operations further include:

maintaining, on the second media device, one or more signal routing tables for one or more wireless media devices.

14. The system of claim 13, wherein the operations further include:

receiving control data from a computing device, wherein the control data is based on user input received at the computing device, and the user input comprises one or more modifications to a signal routing table corresponding to a wireless media device.

15. The system of claim 10, wherein the first switch is integrated in the first wireless media device.

16. The system of claim 10, wherein the first switch is separate from and external to the first wireless media device.

17. The system of claim 10, wherein:

the signals are routed to a first pre-determined destination of the multiple pre-determined destinations in response to positioning the first switch in an open position; and the signals are routed to a second pre-determined destination of the multiple pre-determined destinations in response to positioning the first switch in a close position.

18. The system of claim 17, wherein:

an additional switch corresponds to the first wireless media device; and one of the following occurs in response to positioning the additional switch in a close position: the signals are routed to a third pre-determined destination of the multiple pre-determined destinations, or the first wireless media device is muted.

19. A non-transitory computer readable storage medium including instructions to perform a method for multi-purpose user-definable wireless channel operation, the method comprising:

wirelessly receiving switch state information from a first wireless media device, wherein the switch state information indicates a current switch position of a first switch corresponding to the first wireless media device;

wirelessly receiving signals from the first wireless media device; and selectively routing the signals to one of multiple pre-determined destinations based on the switch state information and a first signal routing table corresponding to the first wireless media device, wherein the first signal routing table maps different switch positions of the first switch to different pre-determined destinations of the multiple pre-determined destinations, and each pre-determined destination of the multiple pre-determined corresponds to a particular channel of a communication bus.

20. The non-transitory computer readable storage medium of claim 19, wherein routing the signals to the first pre-determined destination comprises one of the following: routing the signals to a first channel of a first communication bus coupled to a first signal combining device, or routing the signals over a network connection to the first signal combining device.

* * * * *